United States Patent
Wang

(10) Patent No.: US 12,238,821 B2
(45) Date of Patent: Feb. 25, 2025

(54) SIM CARD SELECTION METHOD AND TERMINAL DEVICE

(71) Applicant: VIVO MOBILE COMMUNICATION CO., LTD., Guangdong (CN)

(72) Inventor: Limin Wang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 577 days.

(21) Appl. No.: 17/482,114

(22) Filed: Sep. 22, 2021

(65) Prior Publication Data

US 2022/0007172 A1 Jan. 6, 2022

Related U.S. Application Data

(63) Continuation of application No. PCT/CN2020/076250, filed on Feb. 21, 2020.

(30) Foreign Application Priority Data

Mar. 26, 2019 (CN) .......................... 201910232922.8

(51) Int. Cl.
H04W 8/18 (2009.01)
H04M 1/72469 (2021.01)
H04W 88/06 (2009.01)

(52) U.S. Cl.
CPC ....... H04W 8/183 (2013.01); H04M 1/72469 (2021.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2015/0092611 | A1* | 4/2015 | Ponukumati | H04W 36/0022 455/414.1 |
| 2015/0120442 | A1 | 4/2015 | Ganesh et al. | |
| 2016/0224304 | A1* | 8/2016 | Hong | H04M 1/724 |
| 2018/0321825 | A1* | 11/2018 | Martineli | G06F 3/0483 |

FOREIGN PATENT DOCUMENTS

| | | | | |
|---|---|---|---|---|
| CN | 103052175 | A | 4/2013 | |
| CN | 105426032 | A | 3/2016 | |
| CN | 106293313 | A | 1/2017 | |
| CN | 104333599 | B | * 10/2017 | ............. G06Q 30/02 |
| CN | 107491324 | A | * 12/2017 | |
| CN | 108848249 | A | 11/2018 | |

(Continued)

OTHER PUBLICATIONS

International Search Report of International Application No. PCT/CN2020/076250 mailed on May 21, 2020.

(Continued)

*Primary Examiner* — Jinsong Hu
*Assistant Examiner* — Alexander J Yi
(74) *Attorney, Agent, or Firm* — IP & T GROUP LLP

(57) ABSTRACT

A SIM card selection method includes: receiving a first input of a user to a target application; and controlling, in response to the first input, the target application to perform a first operation based on a first SIM card. The first SIM card is a SIM card associated with a first display region, and the first display region is a display region in which an icon of the target application is located.

14 Claims, 3 Drawing Sheets

(56) References Cited

FOREIGN PATENT DOCUMENTS

| | | | |
|---|---|---|---|
| CN | 109151162 A | | 1/2019 |
| CN | 110049486 5 | | 7/2019 |
| KR | 20160040022 A | * | 4/2016 |

OTHER PUBLICATIONS

Written Opinion of The International Searching Authority of International Application No. PCT/CN2020/076250 mailed on May 21, 2020.
First Office Action of Priority Application No. CN 201910232922.8 mailed on Mar. 26, 2020.
The Second Office Action of Priority Application No. CN 201910232922.8 mailed on Oct. 12, 2020.
Notification to Grant Patent Right for Invention of Priority Application No. CN 201910232922.8 mailed on Mar. 4, 2021.
Extended European Search Report of Priority Application No. EP20778868.8 issued by the European Patent Office on Apr. 8, 2022.

* cited by examiner

SIM CARD SELECTION METHOD AND TERMINAL DEVICE

CROSS-REFERENCE TO RELATED APPLICATIONS

This application is a Bypass Continuation Application of PCT/CN2020/076250, filed on Feb. 21, 2020, which claims priority to Chinese Patent Application No. 201910232922.8 filed on Mar. 26, 2019, which are incorporated herein by reference in their entirety.

TECHNICAL FIELD

The present disclosure relates to the field of terminal technologies, and in particular, to a SIM card selection method and a terminal device.

BACKGROUND

With the development of terminal technologies and wireless communication technologies, a terminal device is no longer limited to installation of one subscriber identity module (SIM) card, but instead, can support installation of two or more SIM cards, and can separately access a wireless communication network by using each installed SIM card, thereby meeting the needs of a user to use services provided by a plurality of wireless network systems through one terminal device.

SUMMARY

Embodiments of the present disclosure provide a SIM card selection method and a terminal device.

According to a first aspect, an embodiment of the present disclosure provides a SIM card selection method, applied to a terminal device. The method includes: receiving a first input of a user to a target application; controlling, in response to the first input, the target application to perform a first operation based on a first SIM card, where the first SIM card is a SIM card associated with a first display region, and the first display region is a display region in which an icon of the target application is located.

According to a second aspect, an embodiment of the present disclosure provides a terminal device, including: a first receiving unit, configured to receive a first input of a user to a target application; and a first processing unit, configured to control, in response to the first input, the target application to perform a first operation based on a first SIM card, where the first SIM card is a SIM card associated with a first display region, and the first display region is a display region in which an icon of the target application is located.

According to a third aspect, an embodiment of the present disclosure provides a terminal device, including a processor, a memory, a display, and a computer program stored in the memory and executable on the processor. When the computer program is executed by the processor, the steps of the SIM card selection method according to the first aspect are implemented.

According to a fourth aspect, an embodiment of the present disclosure provides a non-transitory computer-readable storage medium. The non-transitory computer-readable storage medium stores a computer program, and when the computer program is executed by a processor, the steps of the SIM card selection method according to the first aspect are implemented.

DESCRIPTION OF EMBODIMENTS

Figure 1:
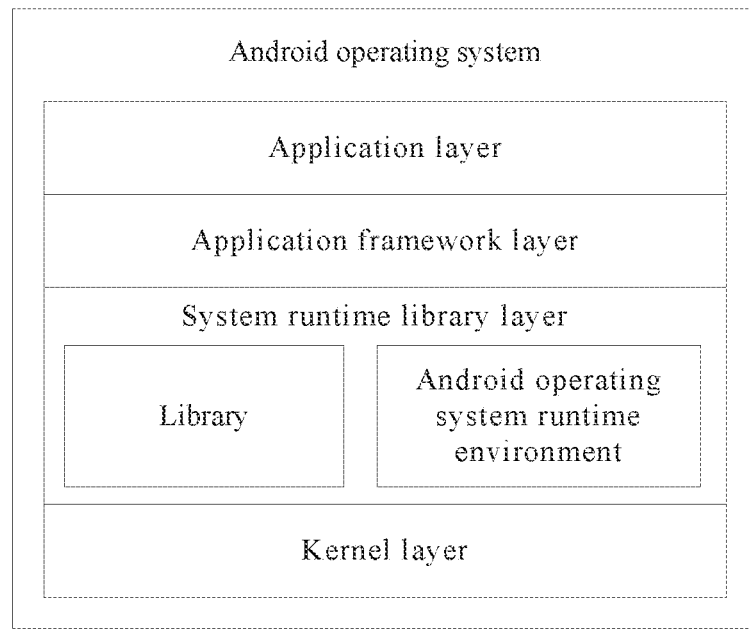
FIG. 1 is an architectural diagram of an Android operating system according to an embodiment of the present disclosure.

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

In this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates that associated objects are in an "or" relationship. In a formula, the character "/" indicates that associated objects are in a "divided" relationship. If not stated, "a plurality of" in this specification means two or more.

In order to clearly describe the technical solutions in the embodiments of the present disclosure, in the embodiments of the present disclosure, the terms such as "first" and "second" are used to distinguish same or similar items with a basically same function or effect. A person skilled in the art can understand that the terms such as "first" and "second" do not limit a quantity and an execution order.

In the embodiments of the present disclosure, the term such as "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. To be precise, the use of the term such as "exemplary" or "for example" is intended to present a related concept in a specific manner. In the embodiments of the present disclosure, unless otherwise specified, the meaning of "a plurality of" means two or more than two.

When an application performs an operation such as login or verification, the operation may be performed based on a SIM card, an email, a registered account of social software, or the like, or the operation may be performed directly without logging in to a corresponding account. Therefore, when the application performs the operation such as login or verification, the user's manual selection is required to perform the operation, which is very cumbersome. In addition, a terminal device with a plurality of SIM cards installed is already very common. For the terminal device with a plurality of SIM cards installed, after a user manually selects performing an operation such as SIM card—based login or verification, the user needs to further manually select a SIM card to use, so as to ensure that the application can perform a corresponding operation based on a correct SIM card. For example, a SIM card 1 and a SIM card 2 are installed on the terminal device, an operator of the SIM card 1 is China Unicorn, and an operator of the SIM card 2 is China Mobile. When logging in to an application "China Mobile Online Business Hall", the user needs to first manually select login based on a SIM card, and then manually select login based on the SIM card 1, so as to ensure that the application "China Mobile Online Services" can use the SIM card 1 for login, instead of using an email, a registered account of social software, or the like for login, and instead of using the SIM card 2 for login.

At present, there are increasing operations that need to be performed based on a SIM card during running of an application. However, each time the application performs an operation based on a SIM card, a user needs to perform manual selection, which is cumbersome and is not conducive to user experience.

In view of the foregoing problem, embodiments of the present disclosure provide a SIM card selection method and a terminal device. According to the SIM card selection method, when a first input of a user to a target application is received, the target application is controlled, in response to the first input, to perform a first operation based on a first SIM card, where the first SIM card is a SIM card associated with a first display region, and the first display region is a display region in which an icon of the target application is located. In other words, according to the embodiments of the present disclosure, when the target application is controlled to perform an operation based on a SIM card, a SIM card associated with the display region in which the icon of the target application is located can be automatically selected, and a corresponding operation is performed based on the SIM card associated with the display region in which the icon of the target application is located. In the embodiments of the present disclosure, when the target application is controlled to perform an operation based on a SIM card, the SIM card associated with the display region in which the icon of the target application is located can be automatically selected to perform a corresponding operation. Therefore, in the embodiments of the present disclosure, the user's manual selection when the application performs an operation based on a SIM card can be avoided on a basis of performing an operation by the application based on a correct SIM card. Therefore, in the embodiments of the present disclosure, a user operation can be simplified, thereby improving user experience.

The SIM card selection method provided in the embodiments of the present disclosure may be applied to a terminal device, and the terminal device may be a terminal device with an operating system. The operating system may be an Android operating system, an iOS operating system, or another possible operating system, which is not limited in the embodiments of the present disclosure.

The following uses the Android operating system as an example to describe a software environment to which the SIM card selection method provided in the embodiments of the present disclosure is applied.

FIG. 1 is a schematic architectural diagram of a possible Android operating system according to an embodiment of the present disclosure. In FIG. 1, an architecture of the Android operating system includes four layers: an application layer, an application framework layer, a system runtime library layer, and a kernel layer (which may be a Linux kernel layer).

The application layer includes various applications in the Android operating system (including system applications and third-party applications).

The application framework layer is a framework of applications. A developer can develop some applications based on the application framework layer while complying with development principles of the application framework.

The system runtime library layer includes a library (also referred to as a system library) and an Android operating system runtime environment. The library mainly provides various resources required for the Android operating system. The Android operating system runtime environment is used for providing a software environment for the Android operating system.

The kernel layer is an operating system layer of the Android operating system, and is a lowest layer of software levels of the Android operating system. Based on the Linux kernel, the kernel layer provides core system services and hardware-related drivers for the Android operating system.

The Android operating system is used as an example. In the embodiments of the present disclosure, a developer can develop, based on the system architecture of the Android operating system shown in FIG. 1, a software program that implements the SIM card selection method provided in the embodiments of the present disclosure, so that the SIM card selection method can be run based on the Android operating system shown in FIG. 1. In other words a processor or the terminal device can implement the SIM card selection method provided in the embodiments of the present disclosure by running the software program in the Android operating system.

The terminal device provided in the embodiments of the present disclosure may be a terminal device such as a mobile phone, a tablet computer, a notebook computer, an ultra-mobile personal computer (UMPC), a netbook, a personal digital assistant (PDA), a smart watch, or a smart band, or the terminal device may be another type of terminal device. This is not limited in the embodiments of the present disclosure.

Figure 2:
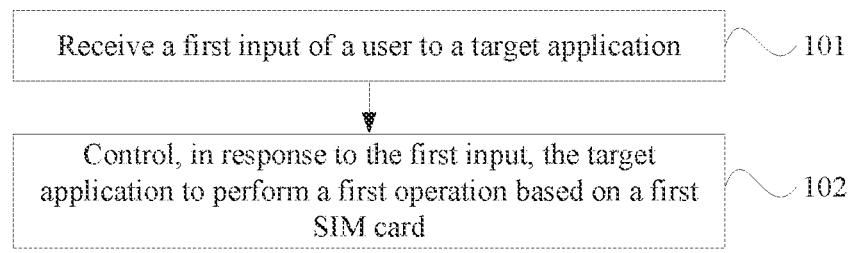
FIG. 2 is a first flowchart of steps of a SIM card selection method according to an embodiment of the present disclosure.

An embodiment of the present disclosure provides a SIM card selection method. Referring to FIG. 2, the SIM card selection method includes the following step 101 and step 102.

Step 101: Receive a first input of a user to a target application.

The first input in this embodiment of the present disclosure may be an input to an icon of the target application, or may be an input to a control in a display interface of the target application. The first input may be at least one of a tap input, a double-tap input, a drag input, a specific voice instruction, or a specific gesture. In some embodiments of the present disclosure, the specific gesture may be any one of a single-tap gesture, a sliding gesture, a pressure recognition gesture, a long press gesture, an area change gesture, a double-press gesture, and a double-tap gesture.

Step 102: Control, in response to the first input, the target application to perform a first operation based on a first SIM card.

The first SIM card is a SIM card associated with a first display region, and the first display region is a display region in which an icon of the target application is located.

To be specific, when the target application is controlled to perform an operation based on a SIM card, the SIM card associated with the display region in which the icon of the target application is located is automatically selected to perform the operation.

For example, the first operation may be at least one of login, sending data, sending a short message, or the like. The first operation is not limited in this embodiment of the present disclosure, provided that the first operation needs to be performed based on a SIM card.

It should be noted that the first display region in this embodiment of the present disclosure may be all display regions of one or more screens of the terminal device. For example, the terminal device includes a first screen on the front and a second screen on the back. The first display region may be an entire display region of the first screen, or an entire display region of the second screen. The first display region may alternatively be a part of a display region of a screen of the terminal device. For example, if the terminal device includes one screen, the screen of the terminal device may be divided into a plurality of display regions, and the first display region may be one of the plurality of display regions.

In the foregoing embodiment, when the target application is controlled to perform an operation based on a SIM card, the SIM card associated with the display region in which the icon of the target application is located needs to be selected to perform the operation. Therefore, before the first operation is performed based on the first SIM card, the first screen needs to be associated with the first SIM card, and the icon of the target application needs to be displayed in the first display region of the terminal device.

Optionally, in this embodiment of the present disclosure, the following step a and step b may be performed before the foregoing step 101 (receive the first input of the user), so that the first screen is associated with the first SIM card.

Step a: Receive a sixth input of the user.

The sixth input in this embodiment may be at least one of a tap input, a double-tap input, a drag input, a specific voice instruction, or a specific gesture. In some embodiments of the present disclosure, the specific gesture may be any one of a single-tap gesture, a sliding gesture, a pressure recognition gesture, a long press gesture, an area change gesture, a double-press gesture, and a double-tap gesture.

Step b: Determine, based on the sixth input, an association relationship between a display region of the terminal device and a SIM card installed on the terminal device.

In the foregoing embodiment, the terminal device may determine, based on the sixth input, the association relationship between a display region of the terminal device and a SIM card installed on the terminal device. In other words, the user can customize, according to a requirement, the association relationship between a display region of the terminal device and a SIM card installed on the terminal device. Therefore, in the foregoing embodiment, use experience of the user can be improved.

It should be noted that the association relationship between a display region of the terminal device and a SIM card installed on the terminal device is not limited in this embodiment of the present disclosure, and the user can customize, according to a requirement, the association relationship between a display region of the terminal device and a SIM card installed on the terminal device.

Figure 3:
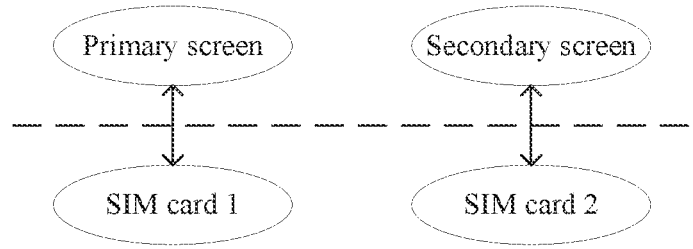
FIG. 3 is a first schematic diagram of an association relationship between a display region and a SIM card according to an embodiment of the present disclosure.

For example, referring to FIG. 3, an example is taken in FIG. 3 for describing the foregoing embodiment: the terminal device includes two screens, which are a primary screen and a secondary screen, the primary screen and the secondary screen each are a display region, and a SIM card 1 and a SIM card 2 are installed on the terminal device. An association relationship between the screens of the terminal device and the SIM cards installed on the terminal device may be: the primary screen is associated with the SIM card 1, and the secondary screen is associated with the SIM card 2.

Figure 4:
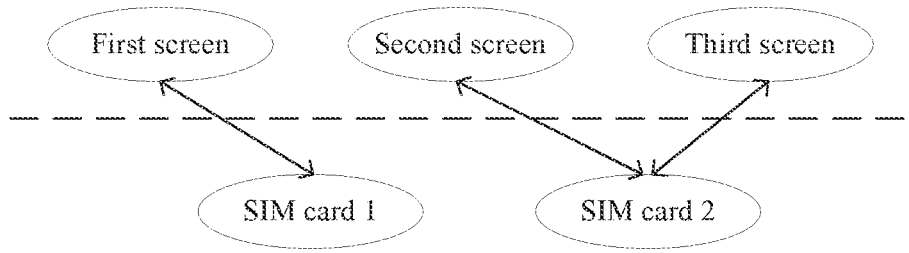
FIG. 4 is a second schematic diagram of an association relationship between a display region and a SIM card according to an embodiment of the present disclosure.

For example, referring to FIG. 4, an example is taken in FIG. 4 for describing the foregoing embodiment: the terminal device includes a first screen, a second screen, and a third screen, the first screen, the second screen, and the third screen each are a display region, and a SIM card 1 and a second SIM card 2 are installed on the terminal device. An association relationship between the screens of the terminal device and the SIM cards installed on the terminal device may be: the first screen is associated with the SIM card 1, the second screen is associated with the SIM card 2, and the third screen is associated with the SIM card 2.

Optionally, scenarios where the display region in which the icon of the target application is located is the first display region of the terminal device includes the following.

Scenario 1: Before the first input of the user is received, the target application is installed, and during the installation, the icon of the target application is displayed in the first display region of the terminal device.

Optionally, an implementation process of installing the target application and displaying the icon of the target application on the first screen of the terminal device during the installation may include the following step 201 and step 202.

Step 201: Receive a second input of the user.

Optionally, the second input may be an input to an installation control corresponding to the target application in an application store, or an input to an installation package of the target application.

In addition, the second input may be at least one of a tap input, a double-tap input, a drag input, a specific voice instruction, or a specific gesture. In some embodiments of the present disclosure, the specific gesture may be any one of a single-tap gesture, a sliding gesture, a pressure recognition gesture, a long press gesture, an area change gesture, a double-press gesture, and a double-tap gesture.

Step 202: In response to the second input, install the target application, and display the icon of the target application in the first display region.

In the foregoing embodiment, the target application can be installed in response to the second input of the user, and the icon of the target application is displayed in the first display region. Therefore, in the foregoing embodiment, during the installation of the application, the icon of the target application can be displayed in the first display region, and further, the target application is controlled to perform the corresponding operation based on the SIM card associated with the first display region.

Optionally, the displaying the icon of the target application in the first display region in the foregoing step 202 may include:

determining whether the target application is associated with the first SIM card, and when it is determined that the target application is associated with the first SIM card, displaying the icon of the target application in the first display region.

Optionally, a manner of the foregoing determining whether the target application is associated with the first SIM card may be: determining by the terminal device based on an attribute of the target application and related information of the first SIM card, or may be: displaying, by the terminal device, reminder information used to remind the user to select whether the target application is associated with the first SIM card, and determining, by using selection information input by the user, whether the target application is associated with the first SIM card.

Optionally, the displaying the icon of the target application in the first display region in the foregoing step 202 may include:

based on the second input, determining that a SIM card associated with the target application is the first SIM card, and displaying the icon of the target application in the first display region.

For example, the second input may be a drag input for dragging the installation package of the target application to the first display region. In response to the second input, the terminal device can determine the SIM card associated with the target application is the first SIM card, and display the icon of the target application in the first display region.

In the foregoing embodiment, the SIM card associated with the target application can be determined based on a user operation, and then the icon of the target application is displayed in a display region associated with the SIM card. Therefore, in the foregoing embodiment, it cats be avoided that the icon of the target application is displayed in an incorrect display region, thereby preventing the target application from performing a related operation based on the incorrect SIM card.

Scenario 2: During installation, an icon of the target application is located in another position different from the first display region, and after the installation, the icon of the target application is moved to the first display region by means of moving the icon.

Scenario 3: The target application is a built-in application of a system of the terminal device, and the icon of the target application is displayed in the first display region by default.

Scenario 4: The target application is a built-in application of the system of the terminal device, and the icon of the target application is located in another position different from the first display region by default. The user moves the icon of the target application to the first display region by means of moving the icon.

According to the SIM card selection method provided in this embodiment of the present disclosure, when the first input of the user to the target application is received, the target application is controlled, in response to the first input, to perform the first operation based on the first SIM card, where the first SIM card is a SIM card associated with the first display region, and the first display region is a display region in which the icon of the target application is located. In other words, according to this embodiment of the present disclosure, when the target application is controlled to perform an operation based on a SIM card, the SIM card associated with the display region in which the icon of the target application is located can be automatically selected, and a corresponding operation is performed based on the SIM card associated with the display region in which the icon of the target application is located. In the embodiments of the present disclosure, when the target application is controlled to perform an operation based on a SIM card, the SIM card associated with the display region in which the icon of the target application is located can be automatically selected to perform a corresponding operation. Therefore, in the embodiments of the present disclosure, the user's manual selection when the application performs an operation based on a SIM card can be avoided on a basis of performing an operation by the application based on a correct SIM card. Therefore, in the embodiments of the present disclosure, a user operation can be simplified, thereby improving user experience.

Figure 5:
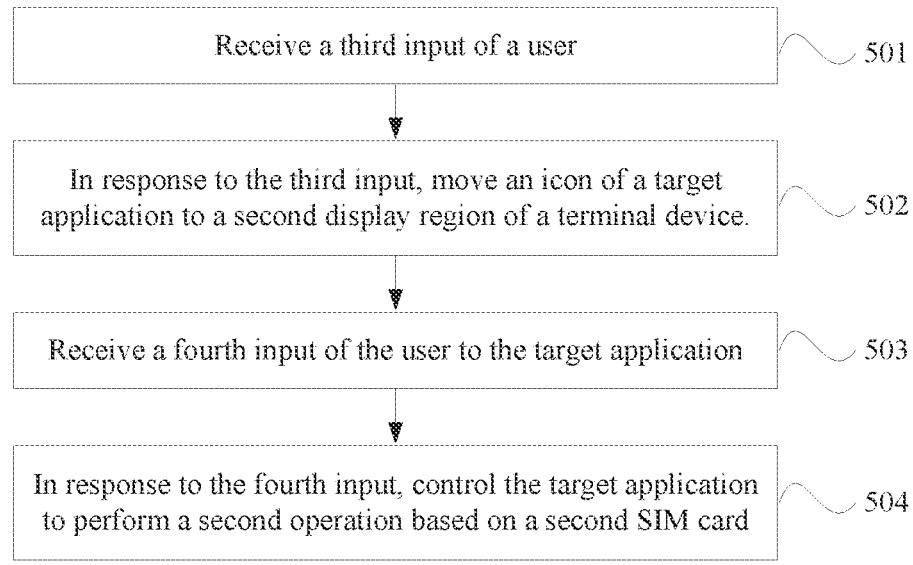
FIG. 5 is a second flowchart of steps of a SIM card selection method according to an embodiment of the present disclosure.

Optionally, referring to FIG. 5, after the foregoing step 102 (control, in response to the first input, the target application to perform the first operation based on the first SIM card), the SIM card selection method provided in this embodiment of the present disclosure further includes the following steps 501 to step 504.

Step 501: Receive a third input of the user.

The third input in this embodiment of the present disclosure may be at least one of a tap input, a double-tap input, a drag input, a specific voice instruction, or a specific gesture. In some embodiments of the present disclosure, the specific gesture may be any one of a single-tap gesture, a sliding gesture, a pressure recognition gesture, a long press gesture, an area change gesture, a double-press gesture, and a double-tap gesture.

Step 502: in response to the third input, move the icon of the target application to a second display region of the terminal device.

It should be noted that an implementation of moving an icon of an application from one display region to another display region is not limited in this embodiment of the present disclosure, provided that the icon of the target application can be moved from the first display region to the second display region of the terminal device.

Optionally, the first display region is the first screen of the terminal device, and the second display region is the second screen of the terminal device.

In other words, the first display region and the second display region may be two independent screens of the terminal device, respectively.

Because the first display region is the first screen of the terminal device, and the second display region is the second screen of the terminal device, the user can set an association relationship between a screen and a SIM card, and display an icon of an application on a corresponding screen, so as to control the application to perform a related operation based on a SIM card associated with a screen in which the icon of the application is located.

Step 503: Receive a fourth input of the user to the target application.

The fourth input in this embodiment of the present disclosure may be an input to an icon of the target application, or may be an input to a control in a display interface of the target application. The fourth input may be at least one of a tap input, a double-tap input, a drag input, a specific voice instruction, or a specific gesture. In some embodiments of the present disclosure, the specific gesture may be any one of a single-tap gesture, a sliding gesture, a pressure recognition gesture, a long press gesture, an area change gesture, a double-press gesture, and a double-tap gesture.

Step 504: In response to the fourth input, control the target application to perform a second operation based on a second SIM card.

The second SIM card is a SIM card associated with the second display region.

To be specific, after the icon of the target application is moved from the first display region to the second display region, when the target application is controlled to perform an operation based on a SIM card, the SIM card associated with the second display region is automatically selected to perform the operation, instead of selecting the SIM card associated with the first display region. Therefore, in this embodiment of the present disclosure, the SIM card automatically selected when the application performs an operation based on a SIM card can be adjusted by means of moving the icon of the application.

Optionally, after the user has customized an association relationship between a display region of the terminal device and a SIM card installed on the terminal device, the user may forget the association relationship between a display region and a SIM card, that is, may forget which SIM card is associated with the display region. As a result, the user incorrectly moves the icon of the application. To solve the foregoing problem, before the foregoing step 502 (move the icon of the target application to a second display region) and the application icon is moved by mistake. In order to solve the above problem, before step 502 (moving the icon of the target application to the second display region, the SIM card selection method provided in this embodiment of the present disclosure further includes:

displaying target prompt information, where the target prompt information is used to prompt at least one of the following: the SIM card associated with the first display region is the first SIM card, or the SIM card associated with the second display region is the second SIM card.

Optionally, the displaying target prompt information may include at least one of: displaying the target prompt information in the first display region; displaying the target prompt information in the second display region; or displaying the target prompt information in a display region (such as a notification bar) other than the first display region and the second display region.

In the foregoing embodiment, the association relationship between a display region and a SIM card is prompted when the icon is moved, to prevent the user from forgetting the association relationship between a display region and a SIM card installed on the terminal device.

Optionally, the SIM card selection method provided in this embodiment of the present disclosure further includes:
receiving a fifth input of the user; and
in response to the fifth input, moving the icon of the target application to a third display region, where there is no SIM card associated with the third display region.

In other words, in this embodiment of the present disclosure, the icon of the target application can be moved to a display region not associated with any SIM card, to prevent the terminal device from performing a related operation based on a SIM card.

In addition, similar to the first display region and the second display region, the third display region in this embodiment of the present disclosure may be all display regions of one or more screens of the terminal device, or may be a partial display region of one more screens of the terminal device.

In the embodiments of the present disclosure, the terminal device and the like may be divided into function modules based on the foregoing method examples. For example, function modules can be divided corresponding to functions, or two or more functions can be integrated into one module. The foregoing integrated module may be implemented in a form of hardware, or may be implemented in a form of a software function module. It should be noted that the module division in the embodiments of the present disclosure is an example, and is merely logical function division and may be other division in actual implementation.

Figure 6:
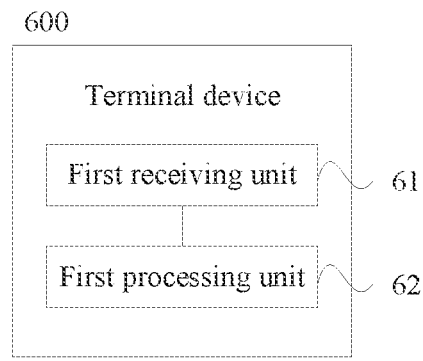
FIG. 6 is a schematic structural diagram of a terminal device according to an embodiment of the present disclosure.

In a case in which integrated units are used, FIG. 6 shows a possible schematic structural diagram of a terminal device 600 involved in the foregoing embodiments, and the terminal device 600 includes:
a first receiving unit 61, configured to receive a first input of a user to a target application; and
a first processing unit 62, configured to control, in response to the first input, the target application to perform a first operation based on a first SIM card, where the first SIM card is a SIM card associated with a first display region, and the first display region is a display region in which an icon of the target application is located.

Optionally, the terminal device further includes:
a second receiving unit, configured to receive a second input of the user; and a second processing unit, configured to, in response to the second input, install the target application, and display the icon of the target application in the first display region.

Optionally, the terminal device further includes:
a third receiving unit, configured to receive a third input of the user; a third processing unit, configured to, in response to the third input, move the icon of the target application to a second display region; a fourth receiving unit, configured to receive a fourth input of the user to the target application; and a fourth processing unit, configured to, in response to the fourth input, control the target application to perform a second operation based on a second SIM card, where the second SIM card is a SIM card associated with the second display region.

Optionally, the terminal device further includes:
a fifth processing unit, configured to display target prompt information, where the target prompt information is used to prompt at least one of the following: the SIM card associated with the first display region is the first SIM card, or the SIM card associated with the second display region is the second SIM card.

Optionally, the first display region is a first screen of the terminal device, and the second display region is a second screen of the terminal device.

Optionally, the terminal device further includes:
a fifth receiving unit, configured to receive a fifth input of the user; and a sixth processing unit, configured to, in response to the fifth input, move the icon of the target application to a third display region, where there is no SIM card associated with the third display region.

Optionally, the terminal device further includes:
a sixth receiving unit, configured to receive a sixth input of the user; and a seventh processing unit, configured to, based on the sixth input, determine an association relationship between a display region of the terminal device and a SIM card installed on the terminal device.

According to the terminal device provided in this embodiment of the present disclosure, when the first input of the user to the target application is received, the target application is controlled, in response to the first input, to perform the first operation based on the first SIM card, where the first SIM card is a SIM card associated with the first display region, and the first display region is a display region in which the icon of the target application is located. In other words, according to this embodiment of the present disclosure, when the target application is controlled to perform an operation based on a SIM card, the SIM card associated with the display region in which the icon of the target application is located can be automatically selected, and a corresponding operation is performed based on the SIM card associated with the display region in which the icon of the target application is located. In the embodiments of the present disclosure, when the target application is controlled to perform an operation based on a SIM card, the SIM card associated with the display region in which the icon of the target application is located can be automatically selected to perform a corresponding operation. Therefore, in the embodiments of the present disclosure, the user's manual selection when the application performs an operation based on a SIM card can be avoided on a basis of performing an operation by the application based on a correct SIM card. Therefore, in the embodiments of the present disclosure, a user operation can be simplified, thereby improving user experience.

Figure 7:
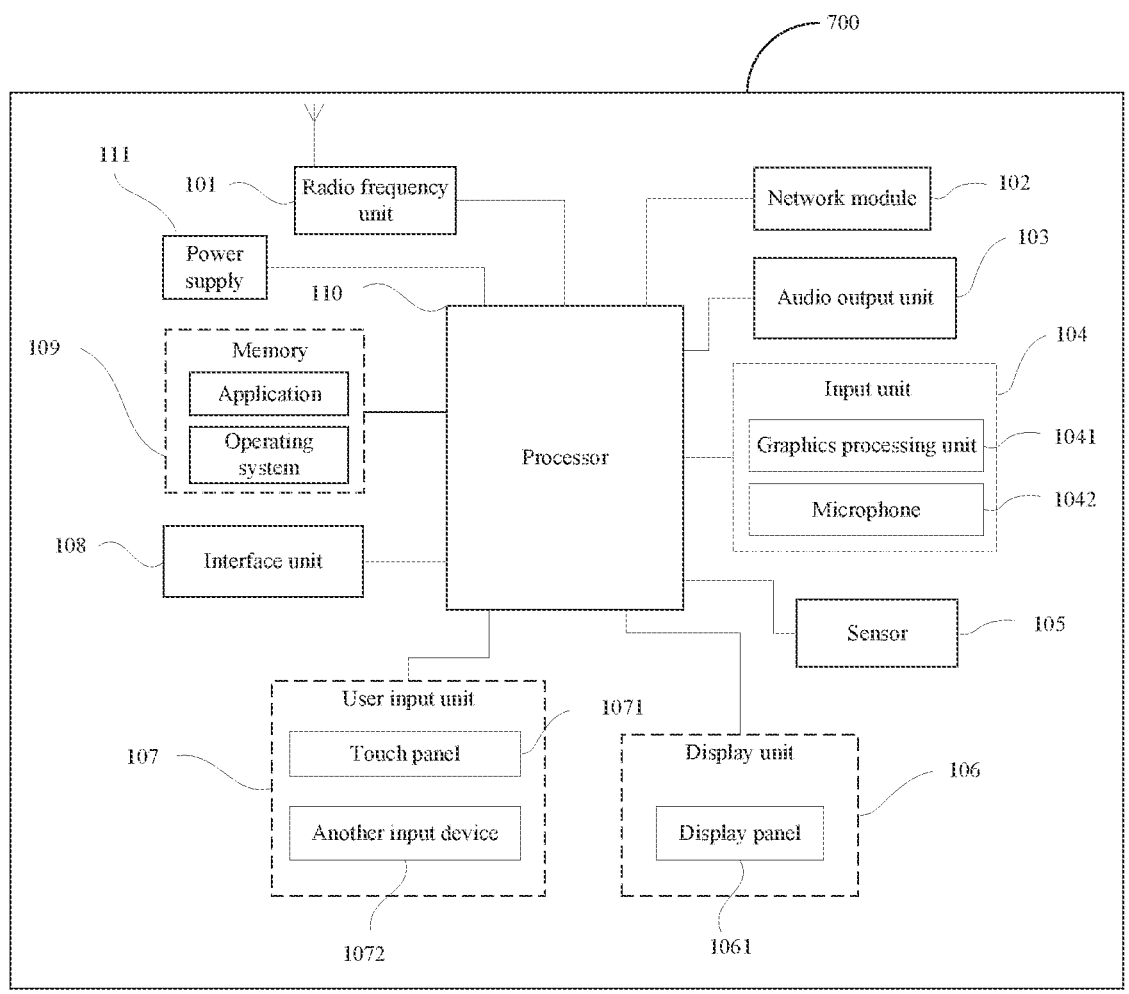
FIG. 7 is a schematic hardware structural diagram of a terminal device according to an embodiment of the present disclosure.

FIG. 7 is a schematic hardware structural diagram of a terminal device for implementing the SIM card selection method according to the embodiments of the present disclosure. The terminal device 700 includes but is not limited to: components such as a radio frequency unit 101, a network module 102, an audio output unit 103, an input unit 104, a sensor 105, a display unit 106, a user input unit 107, an interface unit 108, a memory 109, a processor 110, a power supply 111, and at least one SIM card provided in any one of the foregoing embodiments. A person skilled in the art may understand that a structure of the terminal device shown in FIG. 7 does not constitute a limitation on the terminal device, and the terminal device may include more or fewer components than those shown in the figure, or combine some components, or have different component arrangements. In this embodiment of the present disclosure, the terminal device includes but is not limited to: a mobile phone, a tablet computer, a notebook computer, a palmtop computer, an in-vehicle terminal, a wearable device, a pedometer, and the like.

The user input unit 107 is configured to receive a first input of a user to a target application.

The processing processor 110 is configured to control, in response to the first input, the target application to perform a first operation based on a first SIM card, where the first SIM card is a SIM card associated with a first display region, and the first display region is a display region in which an icon of the target application is located.

According to the terminal device provided in this embodiment of the present disclosure, when the first input of the user to the target application is received, the target application is controlled, in response to the first input, to perform the first operation based on the first SIM card, where the first SIM card is a SIM card associated with the first display region, and the first display region is a display region in which the icon of the target application is located. In other words, according to this embodiment of the present disclosure, when the target application is controlled to perform an operation based on a SIM card, the SIM card associated with the display region in which the icon of the target application is located can be automatically selected, and a corresponding operation is performed based on the SIM card associated with the display region in which the icon of the target application is located. In the embodiments of the present disclosure, when the target application is controlled to perform an operation based on a SIM card, the SIM card associated with the display region in which the icon of the target application is located can be automatically selected to perform a corresponding operation. Therefore, in the embodiments of the present disclosure, the user's manual selection when the application performs an operation based on a SIM card can be avoided on a basis of performing an operation by the application based on a correct SIM card. Therefore, in the embodiments of the present disclosure, a user operation can be simplified, thereby improving user experience.

It should be understood that in this embodiment of the present disclosure, the radio frequency unit 101 may be configured to receive and transmit information, or receive and transmit a signal during a call. For example, the radio frequency unit 101 receives downlink data from a base station, and then transmits the downlink data to the processor 110 for processing; and in addition, transmits uplink data to the base station. Usually, the radio frequency unit 101 includes but is not limited to an antenna, at least one amplifier, a transceiver, a coupler, a low noise amplifier, a duplexer, or the like. In addition, the radio frequency unit 101 may communicate with a network and another device through a wireless communications system.

The terminal device provides wireless broadband Internet access for the user by using the network module 102, for example, helping the user to send and receive an e-mail, brows a web page, and access streaming media.

The audio output unit 103 can convert audio data received by the radio frequency unit 101 or the network module 102 or stored in the memory 109 into an audio signal, and output the audio signal as sound. In addition, the audio output unit 103 may further provide audio output (for example, call signal receiving sound or message receiving sound) related to a specific function performed by the terminal device. The audio output unit 103 includes a speaker, a buzzer, a receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. An image frame processed by the graphics processing unit 1041 may be stored in the memory 109 (or another storage medium) or sent via the radio frequency unit 101 or the network module 102. The microphone 1042 may receive sound and may process such sound into audio data. The processed audio data may be converted, in a call mode, into a format that may be sent to a mobile communication base station by using the radio frequency unit 101 for output.

The terminal device further includes at least one type of sensor 105, such as a Hall displacement transducer, a light sensor, a motion sensor, and another sensor. The light sensor includes an ambient light sensor and a proximity sensor. The ambient light sensor can adjust a brightness of a display panel 1061 based on a brightness of ambient light. The proximity sensor can close the display panel 1061 and/or backlight when the terminal device moves to an ear. As a type of motion sensor, an accelerometer sensor may detect an acceleration value in a plurality of directions (generally, three axes), and detect a value and a direction of gravity when the accelerometer sensor is static, and may be configured to recognize a terminal device posture (such as switching between landscape and portrait modes, a related game, or magnetometer posture calibration), and perform a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information inputted by a user or information provided to a user. The display unit 106 may include a display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device. The user input unit 107 includes a touch panel 1071 and another input device 1072. The touch panel 1071, also referred to as a touchscreen, can collect a touch operation performed by a user on or near the touch panel 1071 (such as an operation on or near the touch panel 1071 performed by a user by using any suitable object or accessory such as a finger or a stylus). The touch panel 1071 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, and sends the touch point coordinates to the processor 110; and receives and executes a command sent by the processor 110. In addition, the touch panel 1071 may be implemented as a resistive type, a capacitive type, an infrared type, a surface acoustic wave type, or the like. The user input unit 107 may further include the another input device 1072 in addition to the touch panel 1071. The another input device 1072 may include but is not limited to a physical keyboard, a function key (such as a volume control key or an on/off key), a trackball, a mouse, and a joystick. Details are not described herein again.

The touch panel 1071 may cover the display panel 1061, When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 7, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface connecting an external apparatus to the terminal device. For example, the interface unit 108 may include a wired or wireless headset jack, an external power supply (or a battery charger) port, a wired or wireless data port, a storage card port, a port for connecting an apparatus having a recognition module, an audio input/output (I/O) port, a video I/O port, an earphone jack, or the like. The interface unit 108 may be configured to receive input (for example, data information and power) from an external apparatus and transmit the received input to one or more elements within the terminal device, or may be configured to transmit data between the terminal device and the external apparatus.

The memory 109 may be configured to store software programs and various data. The memory 109 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 109 may include a high-speed random access memory, or may include a non-volatile memory, for example, at least one disk storage device, a flash memory, or another non-volatile solid-state storage device.

The processor 110 is a control center of the terminal device, and is connected to a plurality of parts of the entire terminal device by using various interfaces and lines, and performs various functions of the terminal device and processes data by running or executing the software program and/or modules stored in the memory 109 and invoking the data stored in the memory 109, to implement overall monitoring on the terminal device. The processor 110 may include one or more processing units. Optionally, the processor 110 may integrate an application processor and a modem processor. The application processor mainly processes an operating system, a user interface, an application, and the like. The modem processor mainly processes wireless communication. It can be understood that alternatively, the modem processor may not be integrated into the processor 110.

The terminal device may further include the power supply 111 (for example, a battery) that supplies power to a plurality of components. Optionally, the power supply 111 may be logically connected to the processor 110 by using a power management system, to implement functions such as charging, discharging, and power consumption management by using the power management system.

In addition, the terminal device includes some function modules not shown. Details are not described herein.

An embodiment of the present disclosure further provides a non-transitory computer-readable storage medium. The non-transitory computer-readable storage medium stores a computer program. When the computer program is executed by a processor, processes of the foregoing SIM card selection method embodiment are implemented, with a same technical effect achieved. To avoid repetition, details are not described herein again. The non-transitory computer-readable storage medium is, for example, a read-only memory (ROM for short), a random access memory (RAM for short), a magnetic disk, or an optical disc.

The terminal device and the non-transitory computer-readable storage medium provided in the embodiments of the present disclosure are both used to perform the corresponding method provided above. Therefore, for beneficial effects that can be achieved thereof, refer to the beneficial effects of the corresponding method provided above. Details are not described herein again.

It should be noted that in this specification, the terms "comprise", "include", and any other variants thereof are intended to cover nor-exclusive inclusion, so that a process, a method, an article, or an apparatus that includes a series of elements not only includes these elements, but also includes other elements not expressly listed, or further includes elements inherent to this process, method, article, or apparatus. In the absence of more restrictions, an element defined by the statement "including a . . . " does not exclude another same element in a process, method, article, or device that includes the element.

The embodiments of the present disclosure are described above with reference to the accompanying drawings, but the present disclosure is not limited to the foregoing specific implementations. The foregoing specific implementations are merely illustrative instead of restrictive. Under enlightenment of the present disclosure, a person of ordinary skill in the art may make many forms without departing from the aims of the present disclosure and the protection scope of the claims, all of which fall within the protection of the present disclosure.

What is claimed is:

1. A subscriber identity module (SIM) card selection method, applied to a mobile terminal device, and comprising:
    receiving a first input of a user;
    in response to the first input, installing a target application, and displaying an icon of the target application in a first display region;
    receiving a second input of the user to the target application; and
    controlling, in response to the second input, the target application to perform a first operation based on a first SIM card, wherein the first SIM card is a SIM card associated with the first display region, and the first display region is a display region in which the icon of the target application is located; wherein
    after the controlling, in response to the second input, the target application to perform the first operation based on the first SIM card, the method further comprises:
    receiving a third input of the user;
    in response to the third input, moving the icon of the target application to a second display region;
    receiving a fourth input of the user to the target application; and
    in response to the fourth input, controlling the target application to perform a second operation based on a second SIM card, wherein the second SIM card is a SIM card associated with the second display region; wherein
    the displaying the icon of the target application in the first display region comprises:
    based on the first input, determining that a SIM card associated with the target application is the first SIM card; and displaying the icon of the target application in the first display region; wherein
    the first display region and the second display region are areas within a screen and areas across multiple screens; and
    the first input, the second input, the third input, and the fourth input are at least one of a tap input, a double-tap input, a drag input, a specific voice instruction, or a specific gesture.

2. The method according to claim 1, wherein before the moving the icon of the target application to the second display region, the method further comprises:
    displaying target prompt information, wherein
    the target prompt information is used to prompt at least one of: the SIM card associated with the first display region is the first SIM card, or the SIM card associated with the second display region is the second SIM card.

3. The method according to claim 1, wherein the first display region is a first screen of the mobile terminal device, and the second display region is a second screen of the mobile terminal device.

4. The method according to claim 1, wherein after the controlling, in response to the second input, the target application to perform the first operation based on the first SIM card, the method further comprises:
    receiving a fifth input of the user; and
    in response to the fifth input, moving the icon of the target application to a third display region, wherein there is no SIM card associated with the third display region.

5. The method according to claim 1, wherein before the receiving the second input of the user to the target application, the method further comprises:
    receiving a sixth input of the user; and
    based on the sixth input, determining an association relationship between a display region of the mobile terminal device and a SIM card installed on the mobile terminal device.

6. A terminal device, comprising a processor, a memory, a display, and a computer program stored in the memory and executable on the processor, wherein the computer program, when executed by the processor, causes the terminal device to perform:
    receiving a first input of a user;
    in response to the first input, installing a target application, and displaying an icon of the target application in a first display region;
    receiving a second input of the user to the target application; and
    controlling, in response to the second input, the target application to perform a first operation based on a first subscriber identity module (SIM) card, wherein the first SIM card is a SIM card associated with the first display region, and the first display region is a display region in which the icon of the target application is located; and
    after the controlling, in response to the second input, the target application to perform the first operation based on the first SIM card, the computer program, when executed by the processor, causes the terminal device to further perform:
    receiving a third input of the user;
    in response to the third input, moving the icon of the target application to a second display region;
    receiving a fourth input of the user to the target application; and
    in response to the fourth input, controlling the target application to perform a second operation based on a second SIM card, wherein the second SIM card is a SIM card associated with the second display region; wherein
    the displaying the icon of the target application in the first display region comprises:
    based on the first input, determining that a SIM card associated with the target application is the first SIM card; and displaying the icon of the target application in the first display region; wherein
    the first display region and the second display region are areas within a screen and areas across multiple screens; and
    the first input, the second input, the third input, and the fourth input are at least one of a tap input, a double-tap input, a drag input, a specific voice instruction, or a specific gesture.

7. The terminal device according to claim 6, wherein the computer program, when executed by the processor, causes the terminal device to further perform:
    displaying target prompt information, wherein
    the target prompt information is used to prompt at least one of: the SIM card associated with the first display region is the first SIM card, or the SIM card associated with the second display region is the second SIM card.

8. The terminal device according to claim 6, wherein the first display region is a first screen of the terminal device, and the second display region is a second screen of the terminal device.

9. The terminal device according to claim 6, wherein the computer program, when executed by the processor, causes the terminal device to further perform:
- receiving a fifth input of the user; and
- in response to the fifth input, moving the icon of the target application to a third display region, wherein there is no SIM card associated with the third display region.

10. The terminal device according to claim 6, wherein the computer program, when executed by the processor, causes the terminal device to further perform:
- receiving a sixth input of the user; and
- based on the sixth input, determining an association relationship between a display region of the terminal device and a SIM card installed on the terminal device.

11. A non-transitory computer-readable storage medium, wherein the non-transitory computer-readable storage medium stores a computer program, and the computer program, when executed by a processor, causes the processor to perform:
- receiving a first input of a user;
- in response to the first input, installing a target application, and displaying an icon of the target application in a first display region;
- receiving a second input of the user to the target application; and
- controlling, in response to the second input, the target application to perform a first operation based on a first subscriber identity module (SIM) card, wherein the first SIM card is a SIM card associated with the first display region, and the first display region is a display region in which the icon of the target application is located; and
- after the controlling, in response to the second input, the target application to perform the first operation based on the first SIM card, the computer program, when executed by the processor, causes the processor to further perform:
- receiving a third input of the user;
- in response to the third input, moving the icon of the target application to a second display region;
- receiving a fourth input of the user to the target application; and
- in response to the fourth input, controlling the target application to perform a second operation based on a second SIM card, wherein the second SIM card is a SIM card associated with the second display region;

wherein the displaying the icon of the target application in the first display region comprises:
- based on the first input, determining that a SIM card associated with the target application is the first SIM card; and displaying the icon of the target application in the first display region;

wherein the first display region and the second display region are areas within a screen and areas across multiple screens; and the first input, the second input, the third input, and the fourth input are at least one of a tap input, a double-tap input, a drag input, a specific voice instruction, or a specific gesture.

12. The non-transitory computer-readable storage medium according to claim 11, wherein the computer program, when executed by the processor, causes the processor to further perform:
- displaying target prompt information, wherein
- the target prompt information is used to prompt at least one of: the SIM card associated with the first display region is the first SIM card, or the SIM card associated with the second display region is the second SIM card.

13. The non-transitory computer-readable storage medium according to claim 11, wherein the computer program, when executed by the processor, causes the processor to further perform:
- receiving a fifth input of the user; and
- in response to the fifth input, moving the icon of the target application to a third display region, wherein there is no SIM card associated with the third display region.

14. The non-transitory computer-readable storage medium according to claim 11, wherein the computer program, when executed by the processor, causes the processor to further perform:
- receiving a sixth input of the user; and
- based on the sixth input, determining an association relationship between a display region of the terminal device and a SIM card installed on the terminal device.

* * * * *